(12) United States Patent
Lin et al.

(10) Patent No.: US 11,367,206 B2
(45) Date of Patent: Jun. 21, 2022

(54) EDGE-GUIDED RANKING LOSS FOR MONOCULAR DEPTH PREDICTION

(71) Applicant: Adobe Inc., San Jose, CA (US)

(72) Inventors: Zhe Lin, Fremont, CA (US); Oliver Wang, Seattle, WA (US); Mai Long, San Jose, CA (US); Ke Xian, Wuhan (CN); Jianming Zhang, Campbell, CA (US)

(73) Assignee: ADOBE INC., San Jose, CA (US)

( * ) Notice: Subject to any disclaimer, the term of this patent is extended or adjusted under 35 U.S.C. 154(b) by 54 days.

(21) Appl. No.: 16/790,056

(22) Filed: Feb. 13, 2020

(65) Prior Publication Data

US 2021/0256717 A1   Aug. 19, 2021

(51) Int. Cl.
*G06T 7/00* (2017.01)
*G06T 7/50* (2017.01)
*G06T 7/13* (2017.01)
*G06N 3/08* (2006.01)
*G06N 3/04* (2006.01)

(52) U.S. Cl.
CPC ............... *G06T 7/50* (2017.01); *G06N 3/08* (2013.01); *G06T 7/13* (2017.01); *G06N 3/04* (2013.01); *G06T 2207/20081* (2013.01); *G06T 2207/20084* (2013.01)

(58) Field of Classification Search
CPC ... G06T 7/50; G06T 7/13; G06T 2207/20081; G06T 2207/20084; G06N 3/08; G06N 3/04

See application file for complete search history.

(56) References Cited

U.S. PATENT DOCUMENTS

| 2020/0167943 A1* | 5/2020 | Kim | G06T 7/174 |
| 2021/0073997 A1* | 3/2021 | Vora | G06N 3/0445 |
| 2021/0118184 A1* | 4/2021 | Pillai | G06N 3/0454 |

* cited by examiner

*Primary Examiner* — Ping Y Hsieh
(74) *Attorney, Agent, or Firm* — F. Chau & Associates, LLC (57) ABSTRACT

In order to provide monocular depth prediction, a trained neural network may be used. To train the neural network, edge detection on a digital image may be performed to determine at least one edge of the digital image, and then a first point and a second point of the digital image may be sampled, based on the at least one edge. A relative depth between the first point and the second point may be predicted, and the neural network may be trained to perform monocular depth prediction using a loss function that compares the predicted relative depth with a ground truth relative depth between the first point and the second point.

19 Claims, 6 Drawing Sheets

EDGE-GUIDED RANKING LOSS FOR MONOCULAR DEPTH PREDICTION

TECHNICAL FIELD

This description relates to depth prediction for digital images, using neural networks.

BACKGROUND

Neural networks are used to classify or otherwise analyze data. For example, a neural network may be trained using pre-classified, ground truth data, so that the resulting, trained neural network will be able to classify newly-received data in the future.

Individual two-dimensional (2D) digital images of three-dimensional (3D) scenes often capture depth information of the 3D scenes. For example, a human viewer of a 2D photograph of an animal in a forest can typically discern a depth (e.g., relative distance) of the animal with respect to the camera being used, and relative to surrounding trees and other scenery.

Such images may be referred to as monocular, because they are taken from only a single perspective. Accurate monocular depth prediction using neural networks and related deep learning techniques is resource-intensive, and subject to various types of errors. Moreover, neural networks trained for monocular depth prediction in one context (e.g., indoors) may perform poorly in another context (e.g., outdoors).

SUMMARY

According to one general aspect, a computer program product may be tangibly embodied on a non-transitory computer-readable storage medium and may include instructions. When executed by at least one computing device, the instructions may be configured to cause the at least one computing device to perform edge detection on a digital image to determine at least one edge of the digital image, and sample a first point and a second point of the digital image, based on the at least one edge. When executed by the at least one computing device, the instructions may be further configured to predict a relative depth between the first point and the second point, and train a neural network to perform monocular depth prediction using a loss function that compares the predicted relative depth with a ground truth relative depth between the first point and the second point.

According to another general aspect, a computer-implemented method may include performing edge detection on a digital image to determine at least one edge of the digital image, and sampling a first point and a second point of the digital image, based on the at least one edge. The computer-implemented method may further include predicting a relative depth between the first point and the second point, and training a neural network to perform monocular depth prediction using a loss function that compares the predicted relative depth with a ground truth relative depth between the first point and the second point.

According to another general aspect, a system may include at least one memory including instructions, and at least one processor that is operably coupled to the at least one memory and that is arranged and configured to execute instructions. When executed, the instructions may cause the at least one processor to execute a neural network to predict monocular depth prediction for a digital image. The neural network may be trained by determining a ground truth depth map for a digital image, identifying at least one edge within the digital image, and identifying a normal direction of a gradient passing through the at least one edge. The neural network may further be trained by sampling a point pair along the gradient, and training the neural network to predict a relative depth between points of the point pair, based on the ground truth depth map.

The details of one or more implementations are set forth in the accompanying drawings and the description below. Other features will be apparent from the description and drawings, and from the claims.

DETAILED DESCRIPTION

This document describes systems and techniques that provide for monocular depth prediction (MDP) using an edge-guided ranking loss. Such systems and techniques overcome technical challenges of previous systems and techniques, and improve the process(es) to perform related automated processing. For example, the described techniques can provide better results than existing techniques, using the same or fewer computing resources (e.g., memory and/or processing resources).

The described MDP techniques utilize a more efficient, faster, more accurate and more complete algorithm(s) than other algorithms that attempt to provide MDP. Moreover, the MDP techniques provide for the new computer functionality of, e.g., training one or more neural networks to provide MDP.

Conventional neural networks may attempt to solve the MDP problem by labelling training datasets with depth data to obtain ground truth training data. Then, depth predictions may be made by a neural network being trained, and the depth predictions may be incrementally improved over multiple training iterations, using a loss function.

Such approaches are subject to various shortcomings and constraints. For example, it may be difficult to obtain a sufficient quantity of suitably-labelled training data. Even to the extent that suitable labelled training data is available for one type of context (e.g., indoors), such training data may not be suitable for other types of contexts (e.g., outdoors).

Further, depth predictions that are based on 2D images may be erroneous, or at least computationally inefficient. For example, attempts to make depth predictions for an image that includes blue sky may waste resources trying to discern depth differences between different portions of the sky, which may not be possible or desirable. In other examples, a 2D image that includes a television (or other screen) may include content displayed using the television, and the algorithm may erroneously detect depth differences within the displayed content, when only a relative depth of the television (or other display) itself may be desirable.

In contrast, the described techniques for MDP include automated generation of large ground truth training datasets. Moreover, the described techniques remove image portions (e.g., sky images) that are not suitable for use in MDP.

Further, the described techniques use an edge-guided loss to make, and improve, depth predictions in an efficient and accurate manner. For example, the described techniques may analyse a monocular image, including performing edge detection to determine a boundary or other edge between two objects or items within the image. Then, using a normal vector taken across the detected edge, it is possible to sample a pair of pixel values from a first side and a second side of the detected edge.

When depth predictions and associated loss calculations are made using such sampled pixel values, it is more likely that meaningful, accurate, and useful depth estimations will result. That is, depth discontinuities within an image are more likely to occur between an object and a background, or between two objects, so that pixel pairs taken from each side of such a depth discontinuity will be strongly correlated with desired depth information.

During training iterations, use of a corresponding loss function will iteratively improve the focus and accuracy of the model being trained in making depth predictions with respect to edges. As a result, the trained model may be configured to produce depth maps with sharp and distinct contours, which provide helpful and accurate depth information. Moreover, the trained model will be less likely to erroneously attribute depth differences to other image aspects, such as texture or design differences within clothing items, or depth differences within television content of a television within an image.

Depth predictions made using the techniques described herein may be made with respect to a wide range of images, taken in many various contexts. For example, a trained model as described herein may be capable of producing accurate depth maps of indoor or outdoor images, including people, animals, or objects of any sort.

Thus, the systems and techniques described herein advantageously improve existing technology areas. For example, as described, computer-based monocular depth prediction is improved. For example, depth maps may be produced with sharp and distinct contours between image portions (e.g., objects) that are at different depths, while also consistently representing image portions that are at the same depths. Further, by recognizing and utilizing intra-image edges, which occur nearly universally in two-dimensional images, the described techniques are applicable to many different types of images, including indoor and outdoor images. Further, the systems and techniques may be used for a more automated and more efficient and faster approach to monocular depth prediction. For example, using edge detection to implement model training enables fast and consistent training across a large and diverse training set of images.

Figure 1:
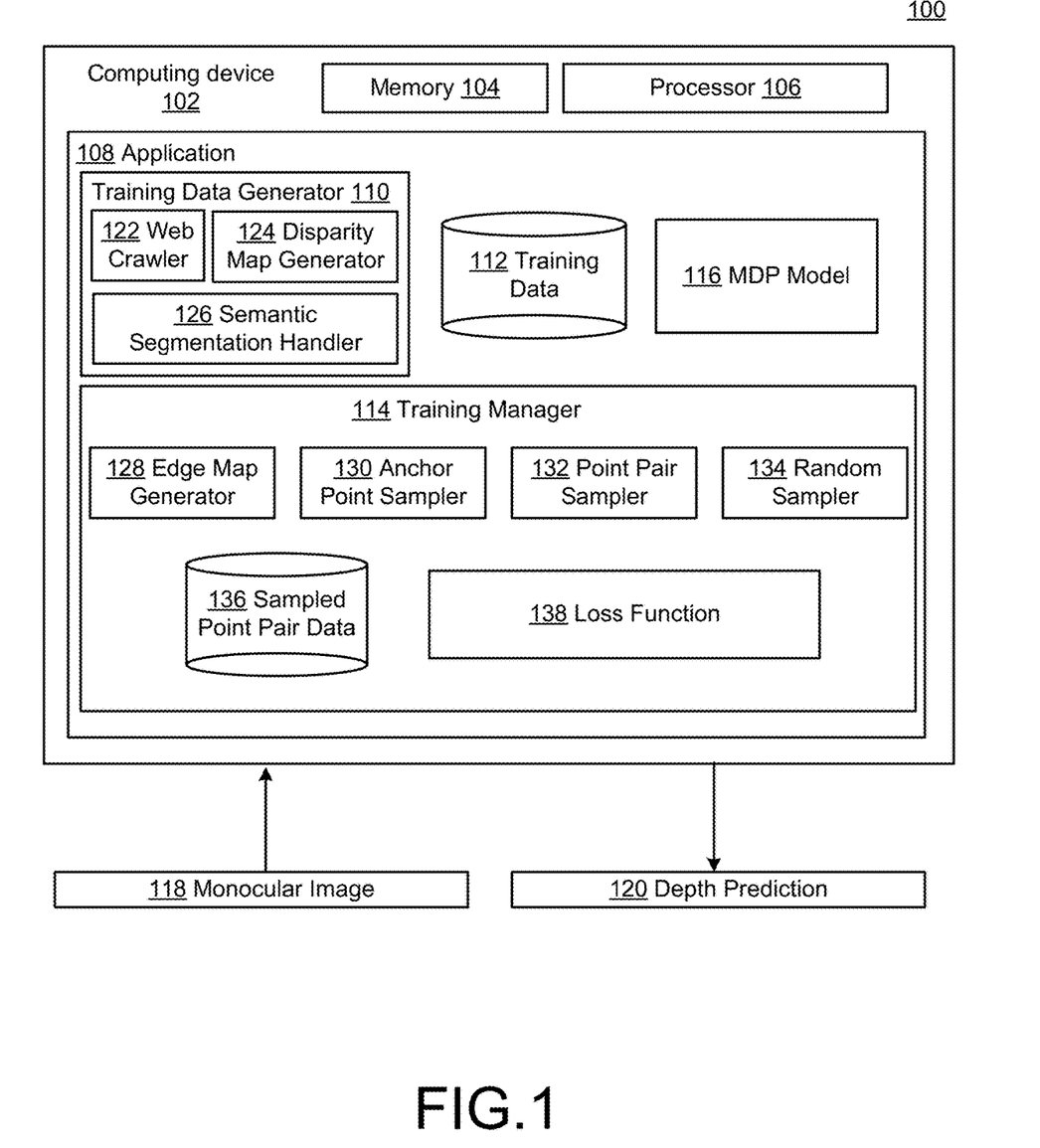
FIG. 1 is a block diagram of a system for monocular depth prediction.

FIG. 1 is a block diagram of a system 100 for monocular depth prediction. The system 100 includes a computing device 102 having at least one memory 104, at least one processor 106 and at least one application 108. The computing device 102 may be implemented as a server, a desktop computer, a laptop computer, or a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The application 108 may be accessed directly by a user of the computing device 102, at the computing device 102. In other implementations, the application 108 may be running on the computing device 102 as a component of a cloud network where a user accesses the application 108 from another computing device over a network.

In the example of FIG. 1, as referenced above and described in more detail below, the system 100 is configured to predict depth maps from monocular images, for use in scenarios such as 2D-3D conversions, shallow depth-of-field operations, and applications using moving stills. The system 100 of FIG. 1 generally utilizes a deep learning based monocular depth estimation model trained on disparity data extracted from web stereo images. Training may be conducted using an edge guided loss, such as an edge-guided ranking loss, which allows the trained model to generate consistent depth maps with sharp contours, even for unconstrained input images, such as natural scenes.

FIG. 1 includes a training data generator 110 that generates disparity data extracted from web stereo images, as just referenced, which is saved as training data 112. The training data 112 thus represents ground truth data to be used by a training manager 114 in training a neural network represented by monocular depth prediction (MDP) model 116. Once the MDP model 116 is trained, virtually any monocular image 118 may be processed to obtain a corresponding depth prediction 120.

In more detail, the training data generator 110 includes a web crawler 122 that is configured to obtain high-quality stereoscopic images that are publicly available on the Internet, or from any other suitable source. For example, key words such as 'stereoscopic' may be used by the web crawler 122 to obtain corresponding left-right images.

A disparity map generator 124 may be configured to automatically generate dense correspondence maps between the left-right stereo images obtained by the web crawler 122. A resulting disparity map provides verifiable ordinal relations between pairs of pixels within each left-right image. The ordinal relations express relative depth between the pairs of pixels within each image. In other words, absolute depth information expressed as a number of meters between imaged objects is not required to be obtained. Rather, a depth between two objects (or pixels thereof) may be expressed in comparison to a depth between a different pair of objects (or pixels). For example, a first depth between a first person and a second person may be compared and/or expressed relative to a second depth between the first person and a third person. Such relative depth information may be very useful in various settings, such as 2D-3D conversion, or moving stills, as referenced above.

In example implementations, the disparity map generator 124 may utilize an optical flow algorithm (such as, e.g., Flownet 2.0) to generate correspondence maps, where a horizontal component of the correspondence map may be regarded as disparity 'd.' For each pixel 'p' in a left image $I_l$, a correspondence p+$d_p$ may be found in the corresponding right image $I_r$.

The resulting disparity map may be subject to various post-processing techniques, such as changing or correcting disparity values that may be inaccurate in an initially-produced disparity map. For example, when the disparity map generator 124 processes image regions without texture, such as sky images in an outdoor setting, disparity values within the sky regions may be internally inaccurate, or inaccurate with respect to other aspects of the outdoor setting. Moreover, even without such potential inaccuracies, it may be preferable to treat a sky region as a single, uniform image portion, to conserve processing power.

In FIG. 1, a semantic segmentation handler 126 is configured to perform semantic segmentation on the stereo images to semantically identify, and segment, textureless image portions, such as sky portions. Then, such segmented portions may be considered to be single, uniform, semantically-identified regions that are effectively omitted from inclusion within the training data 112, e.g., may be masked as infinity within resulting depth maps.

In order to provide such segmentations, the semantic segmentation handler 126 may utilize a multi-path refinement network, such as RefineNet, Residual Net, or other suitably-trained neural network. Segment boundaries may be further optimized (e.g., may be more sharply and distinctly defined), for example, using a fully-connected conditional random field (CRF) network.

Once the training data 112 is available, training may proceed with the training manager 114, using all available images and associated ground truth depth map(s), or disparity maps. For example, an edge map generator 128 may be configured to generate an edge map of each image. A simplified example of an edge map is illustrated and described below, with respect to FIG. 2.

In the present context, an "edge" refers to any boundary within an image between two or more objects, or between an object(s) and a background. For example, edge detection may be executed by detecting brightness discontinuities, where resulting edges may be expressed as line segments, e.g., curved line segments.

The edge map generator 128 may use any suitable or available edge detection technique. In some example embodiments, edge detection may include image smoothing (e.g., smoothing filter, Gaussian smoothing, and/or some other type of noise reduction), followed by a determination of absolute or relative brightness levels of image pixels. Then, edge detection may utilize derivative expressions to determine image brightness gradients, including gradient magnitude and orientation information.

An anchor point sampler 130 may be configured to sample a defined number of anchor points within an edge map produced by the edge map generator 128. An "anchor point" is referenced herein as a point (e.g., pixel) on an edge.

A point pair sampler 132 may be configured to sample, for each anchor point, a point pair along an image gradient (e.g., a directional change in image color or intensity) that runs through the anchor point and traverses, e.g., is perpendicular to, the edge from which the anchor point is taken, at the anchor point. For example, the anchor point may divide the image gradient, with one part of the image gradient on one side of the anchor point, and another part of the image gradient on the other side of the anchor point.

In some example embodiments, a point pair may be taken that includes two points (e.g., pixels) on the image gradient that are both on one side or the other of the anchor point. In other examples, a point pair may be taken with a first point or pixel on the image gradient that is on one side of the anchor point, and a second point or pixel on the image gradient that is on the other side of the anchor point.

In example embodiments, the output of the point pair sampler includes point pairs in which each point pair is taken along an image gradient perpendicular to a detected edge, and defined with respect to an anchor point of the detected edge at which the image gradient is defined. Since depth information within an image is likely to coincide or overlap with edge information, the resulting point pairs are more likely to be useful in subsequent predictions of relative depth within the image, as described in detail herein.

In some implementations, a random sampler 134 may be configured to randomly sample additional point pairs from within an image. In general, the point pairs defined with respect to edges may be prone to emphasizing local patterns within the image. Adding randomly sampled pairs from throughout the image may be useful in generating globally consistent depth values.

For example, a number of point pairs randomly selected by the random sampler 134 may be defined with respect to a number of edge-guided point pairs taken by the point pair sampler 132. For example, the number of random point pairs may be the same as a number of edge-guided point pairs, or may be half as many, or twice as many.

Resulting sampled point pairs may be stored as sampled point pair data 136. Each point pair includes depth information. For example, a point pair taken across an edge may be very close in terms of pixel distance within the image being considered, yet may be associated with a large depth change. Conversely, another point pair, e.g., a random point pair, may be a relatively far apart in terms of a number of pixels separating the points, yet may be at a same depth within the image (such as when two pixels are selected from within a single image object).

In various examples described herein, a loss function 138 is used to train the MDP model 116 including predicting relative depths for each point pair, ranking the various point pairs in terms of relative depth, and then testing the ranked predictions against the ground truth training data 112. Parameters of the MDP model 116 may then be updated at each training iteration, until the MDP model 116 is ready for testing and deployment.

Figure 2:
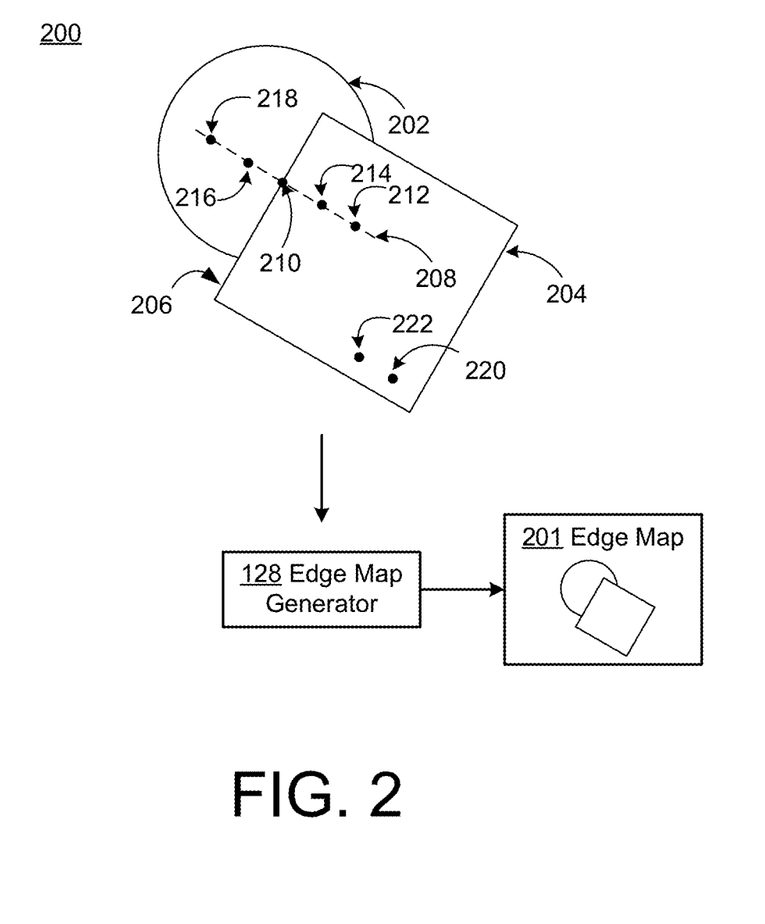
FIG. 2 is a simplified example image that may be used in training the system of FIG. 1.

FIG. 2 is a simplified example image 200 (e.g., the monocular image 118) that may be used in training the system of FIG. 1. In FIG. 2, a circle 202 is illustrated as being behind a square 204. An edge map 201 may be obtained by the edge map generator 128 from the monocular image 118, which may itself be one of two stereoscopic images used by the training data generator 110 to determine depth information for training purposes.

In the simplified example of FIG. 2, the edge map 201 resembles the image 200, but more generally, the edge map 201 may represent any image obtained from another image, which indicates, identifies, or characterizes edges therein. Many types of edge maps 201 may be generated, using various known or future techniques. For example, an edge detection filter may be used. In some examples, edges may be assigned values or weights to indicate relative strengths of the edges. In other examples, thresholds may be used to create binary images.

Using the edge map 201, the anchor point sampler 130 of FIG. 1 may select edge 206 within the image 200. In FIG. 2, the selected edge 206 occurs at an interface between the circle 202 and the square 204, having a normal direction defined by line (e.g., gradient) 208. In other words, the line 208 extends across the interface between the circle 202 and the edge 204, in a direction that is perpendicular to the edge 206 at an anchor point 210.

As referenced above, the anchor point sampler 130 may be configured to receive the edge map 201, and to use the edge map 201 to sample anchor points, such as the anchor point 210, from generated edges. The point pair sampler 132 may then determine the normal gradient 208, and proceed to sample pairs of various points 212, 214, 216, 218 along the normal gradient 208.

For example, the point pair sampler 132 may sample a pair of points on one side of the anchor point 210, such as points pair(s) (212, 214), or (216, 218). In other examples, the point pair sampler 132 may sample point pairs with a point on each side of the anchor point, such as (214, 216), or (212, 216), or (214, 218), or (212, 218).

In example implementations, it may be advantageous or preferred to use a more specific 4-point sampling scheme to enforce the smoothness on each side of a depth boundary. Such an approach may minimize or avoid over-sharpening depth boundaries, which may otherwise lead to halo artifacts along the depth boundaries.

In this approach, sampled edge points may include three point pairs defined from the four points 212, 214, 216, 218. As referenced, the four points may be determined by randomly sampling a pair of points on the normal gradient 208, and within a small, defined distance range of, the anchor point 210. In FIG. 2, such points may be represented by the points 212, 214, 216, 218, which are referred to in the below equations and in Algorithm 1 as points a, b, c, d, respectively, while the anchor point 210 may be referred to as anchor point e.

The four sampled points may be used to define three point pairs having the characteristic that one of the point pairs bridges or crosses the anchor point 210. For example, such a point pair may be defined as the inner two points of the four points (e.g., point pair (214, 216), or (b, c)).

The second and third point pairs are each selected from one of the two sides of the gradient 208. For example, the second and third point pairs may be selected as (212, 214) and (216, 218) (also written as point pairs (a, b) and (c, d)).

In this example approach, and in related approaches referenced above, an edge map "E" (represented by edge map 201 in FIG. 2) may be computed by first converting an image (e.g., monocular image 118) into gray-scale image, and then generating a gradient magnitude map "G", as well as gradient maps $G_x$ and $G_y$ (e.g., using the Sobel operator). Then, the edge map E may be computed by thresholding the gradient magnitude map G, as shown in Eq. (1): $E = \mathbb{1}[G \geq \alpha \cdot \max(G)]$, where $\alpha$ is a threshold to control the density of E.

For each anchor point e=(x, y) sampled from E, the four points $[(x_k, y_k), k=a, b, c, d]$ may be sampled as shown in Eq. (2): $x_k = x + \delta_k G_x(e)/G(e)$; $y_k = y + \delta_k G_y(e)/G(e)$. Then, $\delta_a < \delta_b < 0 < \delta_c < \delta_d$ define sampling of points a, b, c, and d, within a small distance range $\beta$ from the anchor point e. To avoid sampling points too near to the anchor point e, where the ground truth depth value can be hard to define, a margin on each side of the anchor point e may be set, e.g., a 2 pixel margin.

An example summary of the sampling process is provided in Algorithm 1:

Required: Edge masks E, gradient maps $G_x$, $G_y$, and gradient magnitude G, number of edge pixels L to be sampled Initial: Sampled points S=Ø
1: for i=1, 2, . . . , L do
2: Sample an edge point e
3: Sample 4 points $[(x_k, y_k), k=a, b, c, d]$ according Eqn. 5
4: Add (a, b), (b, d) and (c, d) to S
5: end for
6: Return point pair set S Algorithm 1

As also described above, the random sampler 134 may also be used to sample additional point pairs at random, as represented by random point pair (220, 222). Being random, such point pairs may potentially be taken from anywhere in the image 200. However, in some implementations, both the samplers 132, 134 may be configured to utilize selection constraints in sampling points.

For example, the point pair sampler 132 may be configured to select point pairs that are separated by a minimum and/or maximum number of pixels. Additionally, or alternatively, the point pair sampler 132 may be configured to select point pairs that collectively provide a specified distribution of separation distances (as measured in pixels).

For example, the point pair sampler 132 may select point pairs along the gradient 208 that are at least 4 pixels apart, but no more than 30 pixels apart. Across the gradient 208, and other gradients not illustrated in FIG. 2, the point pair sampler 132 may enforce a distribution of separation distances, e.g., between the minimum and maximum distances just referenced. For example, the point pair sampler 132 may select a distribution of separation distances as a normal distribution, with a largest number of point pairs being selected with a separation distance of 17 pixels. Similar comments may apply to the random point pairs selected by the random sampler 134.

Other constraints and parameters may be used, as well. For example, the point pair sampler 132 may be restricted from selecting any point within a minimum distance of the anchor point 210, since, for example, some such pixels may be blurry. The point pair sampler 132 may be configured to select a number of point pairs that may be defined as an absolute quantity of point pairs, or a relative quantity of point pairs that is determined with respect to the overall size of the image 200 (and/or other image characteristics of the image 200).

Similar comments apply to the number of random point pairs selected by the random sampler 134. In addition, the random sampler 134 may be configured to select a number of random point pairs that is chosen relative to the number of point pairs obtained by the point pair sampler 132 (e.g., a number of point pairs that is the same as, or a fraction or multiple of, the number of point pairs sampled by the point pair sampler 132).

Figure 3:
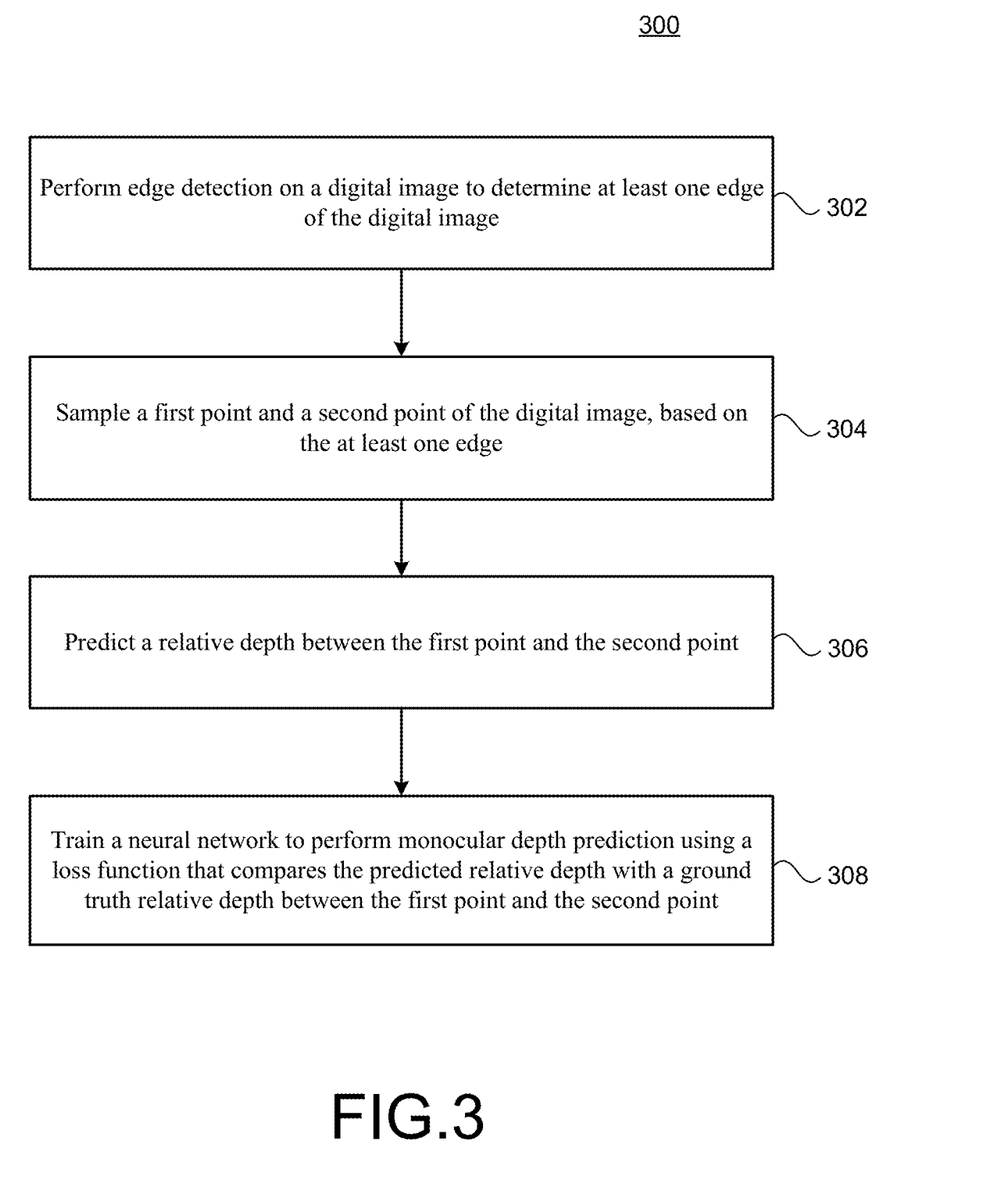
FIG. 3 is a flowchart illustrating example operations of the system of FIG. 1.

FIG. 3 is a flowchart 300 illustrating example operations of the system 100 of FIG. 1. In the example of FIG. 3, operations 302-308 are illustrated as separate, sequential operations. However, it will be appreciated that, in various implementations, additional or alternative operations or sub-operations may be included, and/or one or more operations or sub-operations may be omitted. Further, it may occur that any two or more of the operations or sub-operations may be executed in a partially or completely overlapping or parallel manner, or in a nested, iterative, looped, or branched fashion.

In the example of FIG. 3, edge detection may be performed on a digital image to determine at least one edge of the digital image (302). For example, the edge map generator 128 of FIGS. 1 and 2 may generate the edge map 201 using the digital image 200 of FIG. 2, or using the monocular image 118 of FIG. 1.

A first point and a second point may be sampled, based on the at least one edge (304). For example, the anchor point sampler 130 may initially sample the anchor point 210 of FIG. 2, along the edge 206 determined using the edge map 201. The anchor point sampler 130 may also be used to define a location of the gradient 208, relative to the edge 206. With this information, the point pair sampler 132 may be configured to select any pair(s) of points along the normal direction of the gradient 208, as described above with respect to FIG. 2.

More generally, a pre-determined number of anchor points (e.g., on the order of a few thousand) may be sampled. Gradients and corresponding point pairs may then be determined for each sampled anchor point, in the manner described with respect to the individual example anchor point 210.

A relative depth between the first point and the second point may be predicted (306). For example, in initial iterations, one or more of a number of techniques may be used, and, as described herein, the training manager 114 may be configured to utilize the loss function 138 to generate, update, and improve an accuracy of, future predictions 120 of relative depth. For example, relative depth predictions may initially be random, or random within a defined set of parameters.

In order to add to the focus on local patterns that may be inherent to edge-guided sampling as described herein, more globally-consistent depth information may be generated using the random point pairs obtained by the random sampler 134. Therefore, the edge-guided sampling of point pairs may be augmented and supplemented with random point pairs, such as the point pair (220, 222), so that the point pair (220, 222) may represent a third point and a fourth point to be used in addition to the first point and the second point.

A neural network may be trained to perform monocular depth prediction using a loss function that compares the predicted relative depth with a ground truth relative depth between the first point and the second point (308). For example, as referenced, the loss function 138 may be used to train the MDP model 116 over a number of iterations, until relevant weights, biases, and other parameters of the MDP model 116 are determined to provide sufficiently accurate results. More detailed examples of the MDP model are provided below, e.g., with respect to FIG. 6.

Figure 4:
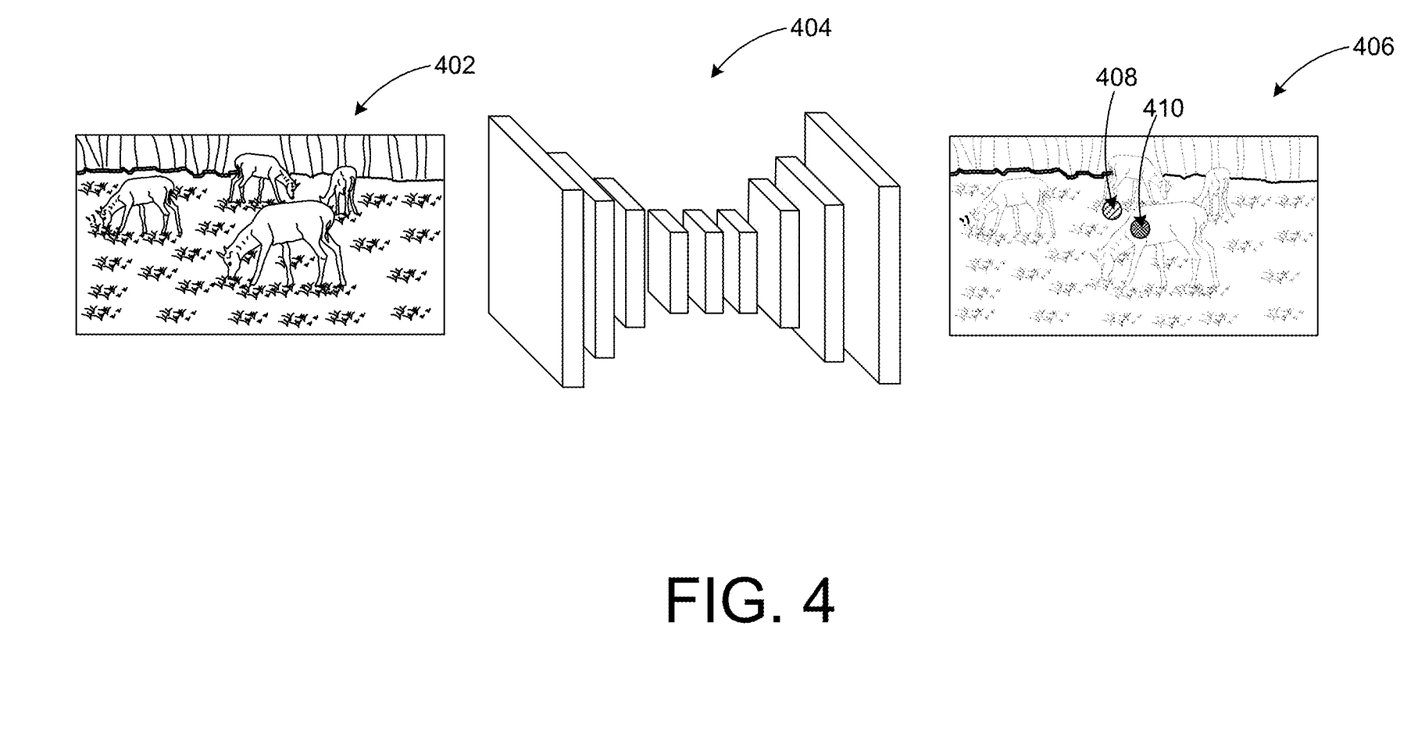
FIG. 4 illustrates an example implementation of the system of FIG. 1.

FIG. 4 illustrates an example implementation of the system of FIG. 1. In FIG. 4, an example image 402 illustrates an outdoor scene of deer in a field. The MDP model 116 is illustrated as an encoder-decode neural network 404, which, as just referenced, is illustrated and described in more detail in FIG. 6.

The encoder-decoder neural network 404 may be trained using the techniques described above, with respect to FIGS. 1-3. Once trained, the encoder-decoder neural network 404 may thus be configured to input the image 402 and output a depth map 406. As also referenced above, in the depth map 406, points (e.g., pixels) that have less relative depth and are relatively closer to the camera that obtained the image 402 may have a correspondingly darker color than points or pixels that represent distances that were farther from the camera at the time of obtaining the image. Of course, in other implementations, the reverse convention may be used, so that darker points/pixels correspond to farther distances and greater depths, or other known or future techniques may be used to represent the depth map 406.

In the example of FIG. 4, for example, a point 410 within an image of a deer is closer to the camera than a point 408 within a field, so that the point 410 is darker in color than the point 408. More generally, constructing the depth map 406 in this manner allows a view to easily obtain a general sense of relative depths within the image 402, while also quantifying specific relative differences between individual point pairs, such as (408, 410).

Figure 5:
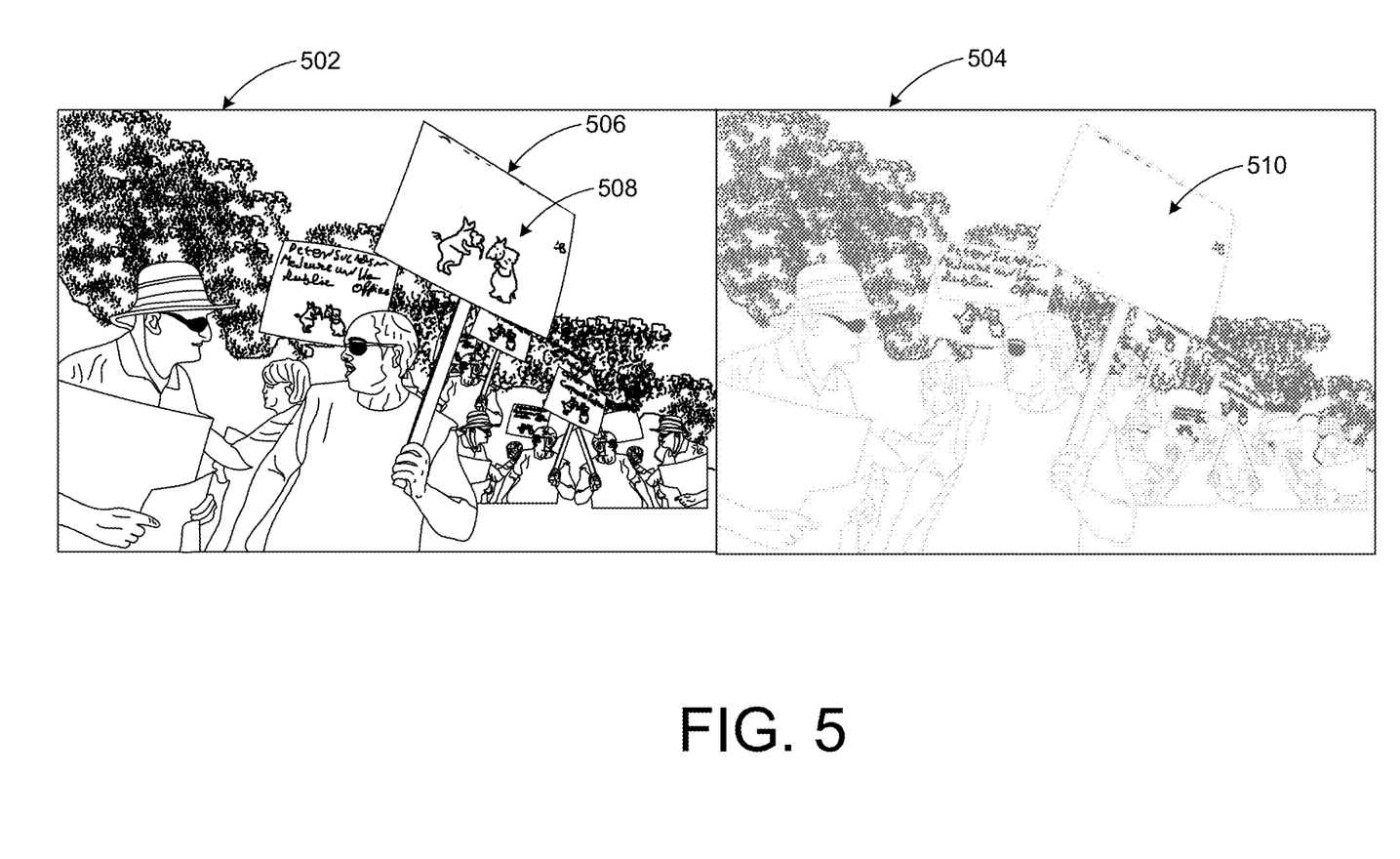
FIG. 5 is an example image and corresponding depth map that may be produced using the system of FIG. 1.

FIG. 5 is an example image 502 and corresponding depth map 504 that may be produced using the system of FIG. 1. FIG. 5 illustrates an advantage over conventional techniques for generating depth maps, using an image of a sign 506 within the image 502.

Specifically, as referenced above, images may sometimes contain images of signs or displays that themselves contain images. In FIG. 5, the sign 506 includes an image 508 that is captured for inclusion within the image 502 as a whole. As referenced, similar circumstances may occur when capturing an image that includes a television or other electronic display screen.

Such images-within-images may themselves contain depth information. In such circumstances, conventional depth prediction techniques may incorrectly attempt to determine and output such depth information. However, for purposes of the image being analyzed, such as the image 502, contained or internal images should be considered to have a substantially uniform depth.

For example, in the example of FIG. 5, the sign 506 has a substantially uniform depth relative to other signs and persons within the image 502, even if internal images 508 within the sign 506 may be at different depths within the sign 506. Consequently, within the depth map 504, a substantially uniform depth 510 is illustrated for the sign 506, which is more accurate and representative in characterizing relative depths within the image 502.

Figure 6:
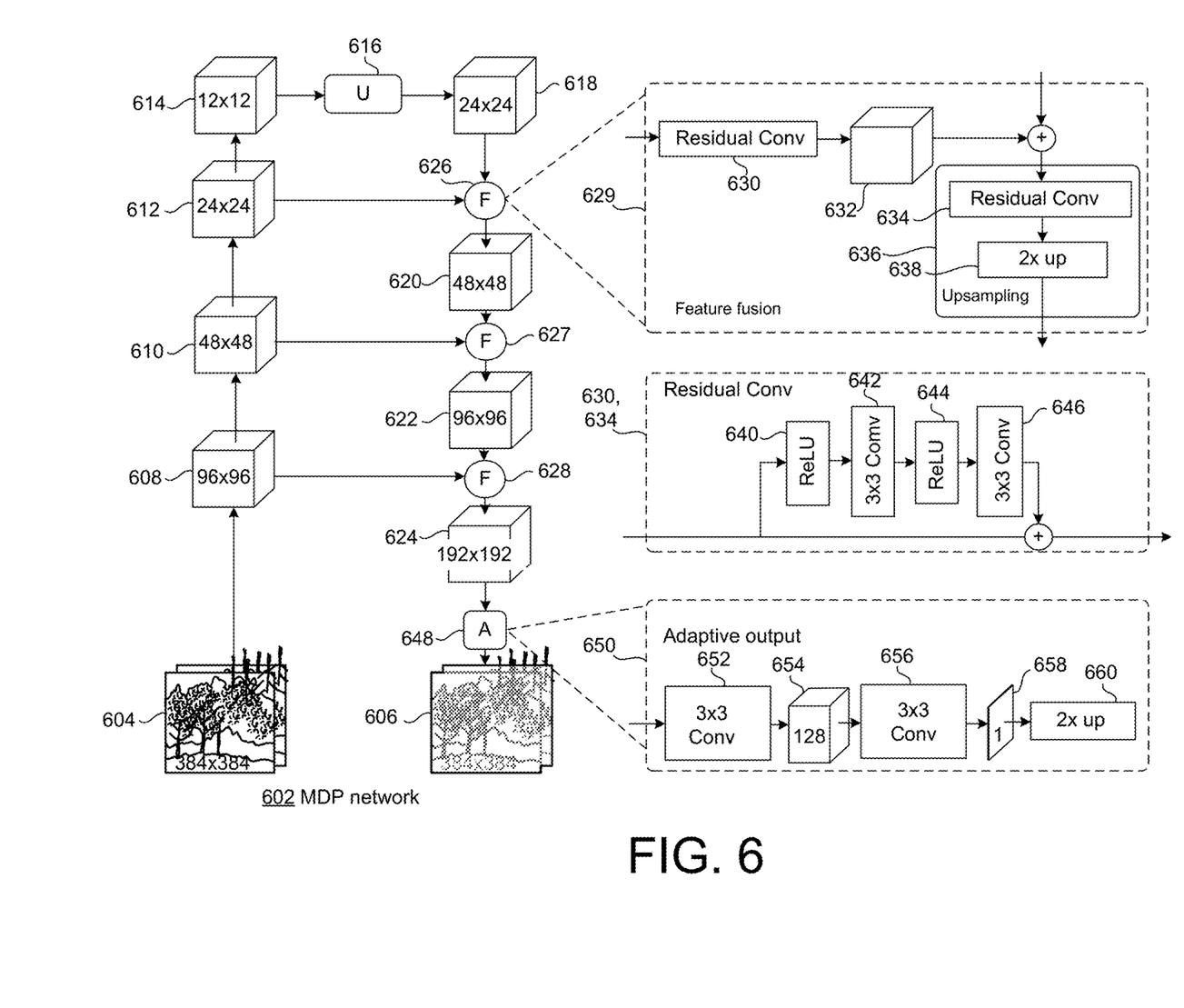
FIG. 6 is a block diagram of a neural network that may be trained for use in the system of FIG. 1.

FIG. 6 is a block diagram of a MDP neural network 602 that may be trained for use in the system of FIG. 1, e.g., as the MDP model 116. In general, such neural networks provide computational models used in machine-learning that are made up of nodes organized in layers. The nodes may also be referred to as artificial neurons, or just neurons, and perform a function on provided input to produce some output value.

Such neural networks generally require a training period to learn parameters (e.g., weights) used to map an input to a specific output. As referenced above in the example of FIG. 1, the training data 112 provides training examples that include a "ground truth" that is used by the training manager 114 to train the MDP 116, e.g., the network 602 of FIG. 6, including executing a series of iterative rounds of training, in which optimal weight values for one or more mapping functions used to map input values to output values are determined.

In determining the optimal weights, the training manager 114 essentially makes predictions based on available data, and then measures the error and the predictions, using the ground truth data. The function used to measure such error levels is often referred to as a loss function, such as the loss function 138 of FIG. 1, which is generally designed to sum over the relevant training examples, and add to the calculated loss if a prediction was incorrect, or reduce/minimize the calculated loss if the prediction was correct. In this way, the various models may be conceptually understood to be trained to learn from mistakes made during the various iterations of predictions, so that the resulting, trained models, as referenced, will be fast, efficient, and accurate when deployed.

In more detail, the parameters of the MDP 116 may include one or more learnable filters, where each filter has spatial dimensions. To apply a CNN, generally, each of the one or more filters is passed (in other words, convolved) across a width and height of filtered pixels of the input image. As the filter is convolved across the width/height and volume of the input image, a dot product or other appropriate calculation may be made between entries of the filter and each input position. As referenced above with respect to neural networks, the parameters of the one or more filters will be adjusted over time, so as to be activated in response to the desired type of visual feature.

The network 602 relies on a formulation of monocular relative depth prediction, or perception, as a regression task, in which a batch of input images I, represented by images 604, are processed with a nonlinear function z=f(I,θ) that is parameterized by θ in an end-to-end fashion to regress pixel-wise relative depth, and thereby obtain corresponding depth maps 606.

The model of 602 is based on a known feedforward ResNet architecture, which is used to generate multi-scale feature maps. As described below, to obtain finer predictions, a progressive refinement strategy may be used to fuse multi-scale features (i.e., multi-scale feature fusion).

Specifically, the model 602 uses a pre-trained ResNet as its backbone to generate a sequence of feature maps 608, 610, 612, 614 at different scales that have different semantics. Since ResNet comprises a sequence of convolution and pooling operations, the receptive field of convolutions is increased to capture more contextual information, while the resolution of output feature maps is decreased. Typically, the size of a final feature map, e.g., the feature map 614, may be 1/32 of the input image 604. Thus, a coarse prediction may be generated if directly up-sampling or performing deconvolution/unpooling on such feature maps.

To obtain a finer prediction, including applying ResNet to dense per-pixel prediction tasks as used herein, a standard, pre-trained ResNet may be modified to remove a final pooling layer, fully-connected layer and softmax layer (not shown in FIG. 6). Since employing only high-level semantic features would result in coarse predictions, as just referenced, a progressive refinement strategy is used in FIG. 6, which merges high level semantic features and low level edge-sensitive features, to obtain more accurate predictions.

As shown, the ResNet is divided into 4 different building blocks according to the resolution of feature maps 608, 610, 612, 614. In each building block, many feature maps are of the same scale. The output of the last layers of individual building blocks may be taken as one input to multi-scale feature fusion modules 626, 627, 628 (described in detail below with respect to enlarged call-out 629 of multi-scale feature fusion module 626).

Multi-scale feature fusion modules 626, 627, 628 take two groups of feature maps as input. One set of feature maps 608, 610, 612, 614 is obtained from ResNet, as referenced above, and the other set of feature maps 618, 620, 622, 624 may be generated by training from scratch.

To conduct progressive refinement operations, an upsampling operation 616 may be performed on the last group of feature maps 614 that are generated by ResNet. Residual convolution blocks 630, 634 may be used so that gradients from high-level layers can be efficiently propagated to low-level layers through short-range and long-range residual connections, as described in more detail, below.

For each feature fusion module, although illustrated only with respect to the feature fusion module 626 for brevity, a residual convolution block 630 may be used to transfer feature maps (e.g., feature map 612) from specific layers of pre-trained ResNet to obtain transferred feature maps (e.g., transferred feature map 632), for merger with fused feature maps produced by last feature fusion module (e.g., feature fusion module 618) via summation.

Then, an upsampling operation 636 is applied to generate feature maps of the same resolution as the next input. As shown, the upsampling 636 includes residual convolution 634 and 2× upsampling 638.

The residual convolution modules 630, 634 are separately illustrated as including a rectified linear unit (ReLU) 640, a 3×3 convolution 642, another ReLU 644, and another 3×3 convolution 646.

To produce final output, an adaptive output module 548 used to adjust the channels of feature maps. As shown in call-out 650, an adaptive output may be obtained using a 3×3 convolution layer 652 with 128 channels 654, k and a 3×3 convolution layer 656 with 1 channel 658, and a bilinear interpolation layer 660.

In order to train the example model of FIG. 6, the loss function 138 of FIG. 1 may be implemented as a ranking loss function, using Eq. (3):

$$L = \sum_{k=1}^{N} \phi(I, i_k, j_k, l_k, z),$$

In Eq. (1), z is the predicted depth map, and $\phi(I, i_k, j_k, l_k, z)$ is the loss of the k-th point pair. For each image I, N point pairs (i, j) may be sampled using the techniques of FIGS. 1-3. Then, the loss may be computed by comparing ordinal (depth) relations of the sampled point pairs with ground-truth point pairs. Specifically, $\phi(I, i_k, j_k, l_k, z)$ may be written as shown in Eq. (4):

$$\phi = \begin{cases} \log(1 + \exp[(-z_{ik} + z_{jk})l_k]) & l_k \neq 0, \\ (z_{ik} - z_{jk})^2 & l_k = 0, \end{cases}$$

where $\ell_k$ is the ordinal relation of k-th pair. To obtain ordinal relation $\ell_{ij}$ between each point pair, depth values $(g_i, g_j)$ are retrieved from a corresponding ground-truth depth map. Then, a ground-truth ordinal relation $\ell_{ij}$ may be defined as shown in Eq. (5):

$$\ell_{ij} = \begin{cases} +1, & \underline{g_i} > 1 + \sigma, \\ -1, & \underline{g_i} > 1 + \sigma, \\ 0, & \text{otherwise.} \end{cases}$$

where σ is an empirical threshold that may be set, for example, to 0.02, or 0.03.

Thus, the described techniques recognize that depth maps follow a strong piece-wise smooth prior, meaning that the depth values change smoothly in most image regions, but not at sharp depth discontinuities that may occur in small portions of an image. The described techniques enable obtaining correct depths at these discontinuities, leading to improved performance for downstream applications. Whereas many or most randomly sampled point pairs may waste their supervision on unimportant relationships, so that depth prediction computed with this strategy often looks blurry and lacks detail, the described techniques are able to predict where depth discontinuities will occur.

Specifically, as described, the techniques concentrate on regions where there are image edges, since most object boundaries exhibit image edges as well. Also useful in successfully predicting depth boundaries at image edges, is avoiding incorrect predictions of depth boundaries at texture edges, e.g. strong image edges that have no actual depth change. By sampling points around image edges as described herein, monocular depth prediction is improved.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   detect at least one edge within a digital image using an edge detection process;
   identify an anchor point on the at least one edge;
   sample a first point and a second point of the digital image based on the edge and the anchor point;
   predict a relative depth between the first point and the second point; and
   train a neural network to perform monocular depth prediction using a loss function that compares the predicted relative depth with a ground truth relative depth between the first point and the second point.

2. The computer program product of claim 1, wherein the instructions, when executed, are further configured to cause the at least one computing device to:
   determine a normal direction of a gradient of the at least one edge that extends on a first side and a second side of the at least one edge and through the anchor point
   wherein the first point and the second point are sampled based on the gradient.

3. The computer program product of claim 1, wherein:
   the first point and the second point are sampled from the first side of the at least one edge.

4. The computer program product of claim 1, wherein:
   the first point is sampled from the first side of the at least one edge; and
   the second point is sampled from the second side of the at least one edge.

5. The computer program product of claim 4, wherein the instructions, when executed, are further configured to cause the at least one computing device to:
   sample a third point from the first side of the at least one edge;
   sample a fourth point from the second side of the at least one edge; and
   predict the relative depth based on point pairs that include the first and third points, the first and second points, and the second and fourth points.

6. The computer program product of claim 1, wherein the instructions, when executed, are further configured to cause the at least one computing device to:
sample a third point and a fourth point at random from the digital image; and
train the neural network to perform monocular depth prediction using the loss function to compare a predicted relative depth between the third point and the fourth point with a ground truth relative depth between the third point and the fourth point.

7. The computer program product of claim 1, wherein the instructions, when executed, are further configured to cause the at least one computing device to:
implement the loss function as a ranking loss function based on an ordinal relation between the first point and the second point, as compared to the ground truth relative depth between the first point and the second point.

8. The computer program product of claim 1, wherein the first point and the second point are a first pixel and a second pixel, respectively, of the digital image.

9. A computer-implemented method, the method comprising:
receive an input image;
perform a convolution operation on the input image using an encoder of a neural network to obtain at least one feature map; and
decode the at least one feature map using a decoder of the neural network to obtain a depth prediction for pixels of the input image,
wherein the neural network is trained to perform monocular depth prediction by:
detecting at least one edge within a digital image;
identifying an anchor point on the at least one edge;
sampling a first point and a second point of the digital image based on the at least one edge and the anchor point; and
predicting a relative depth between the first point and the second point; and
computing a loss function that compares the predicted relative depth with a ground truth relative depth between the first point and the second point.

10. The method of claim 9, further comprising:
determining a normal direction of a gradient of the at least one edge that extends
on a first side and a second side of the at least one edge and through the anchor point,
wherein the first point and the second point are sampled based on the gradient.

11. The method of claim 10, wherein:
the first point and the second point are sampled from the first side of the at least one edge.

12. The method of claim 10, wherein:
the first point is sampled from the first side of the at least one edge; and
the second point is sampled from the second side of the at least one edge.

13. The method of claim 12, further comprising:
sampling a third point from the first side of the at least one edge;
sampling a fourth point from the second side of the at least one edge; and
predicting the relative depth based on point pairs that include the first and third points, the first and second points, and the second and fourth points.

14. The method of claim 9, further comprising:
sampling a third point and a fourth point at random from the digital image; and
training the neural network to perform monocular depth prediction using the loss function to compare a predicted relative depth between the third point and the fourth point with a ground truth relative depth between the third point and the fourth point.

15. The method of claim 9, further comprising:
implementing the loss function as a ranking loss function based on an ordinal relation between the first point and the second point, as compared to the ground truth relative depth between the first point and the second point.

16. The method of claim 9, wherein the first point and the second point are a first pixel and a second pixel, respectively, of the digital image.

17. A system comprising:
at least one memory including instructions; and
at least one processor that is operably coupled to the at least one memory and that is arranged and configured to execute the instructions that, when executed, cause the at least one processor to:
execute a neural network to perform monocular depth prediction for a digital image, the neural network being trained by
identifying an edge of the digital image using an edge detection process;
sampling a first point and a second point of the digital image based on a position of the first point and the second point relative to the edge of the digital image;
predicting a relative depth comprising an ordinal depth relation between the first point and the second point;
computing a ranking loss function by comparing the predicted relative depth to a ground truth relative depth; and
training the neural network to perform monocular depth prediction based on the ranking loss function.

18. The system of claim 17, further comprising:
identifying a direction of a gradient passing through the edge; and
sampling the first point and the second point along the gradient.

19. The system of claim 18, wherein the first point and the second point include a first pixel along the gradient and on a first side of the edge, and a second pixel along the gradient and on a second side of the edge.

* * * * *